Figure 1:
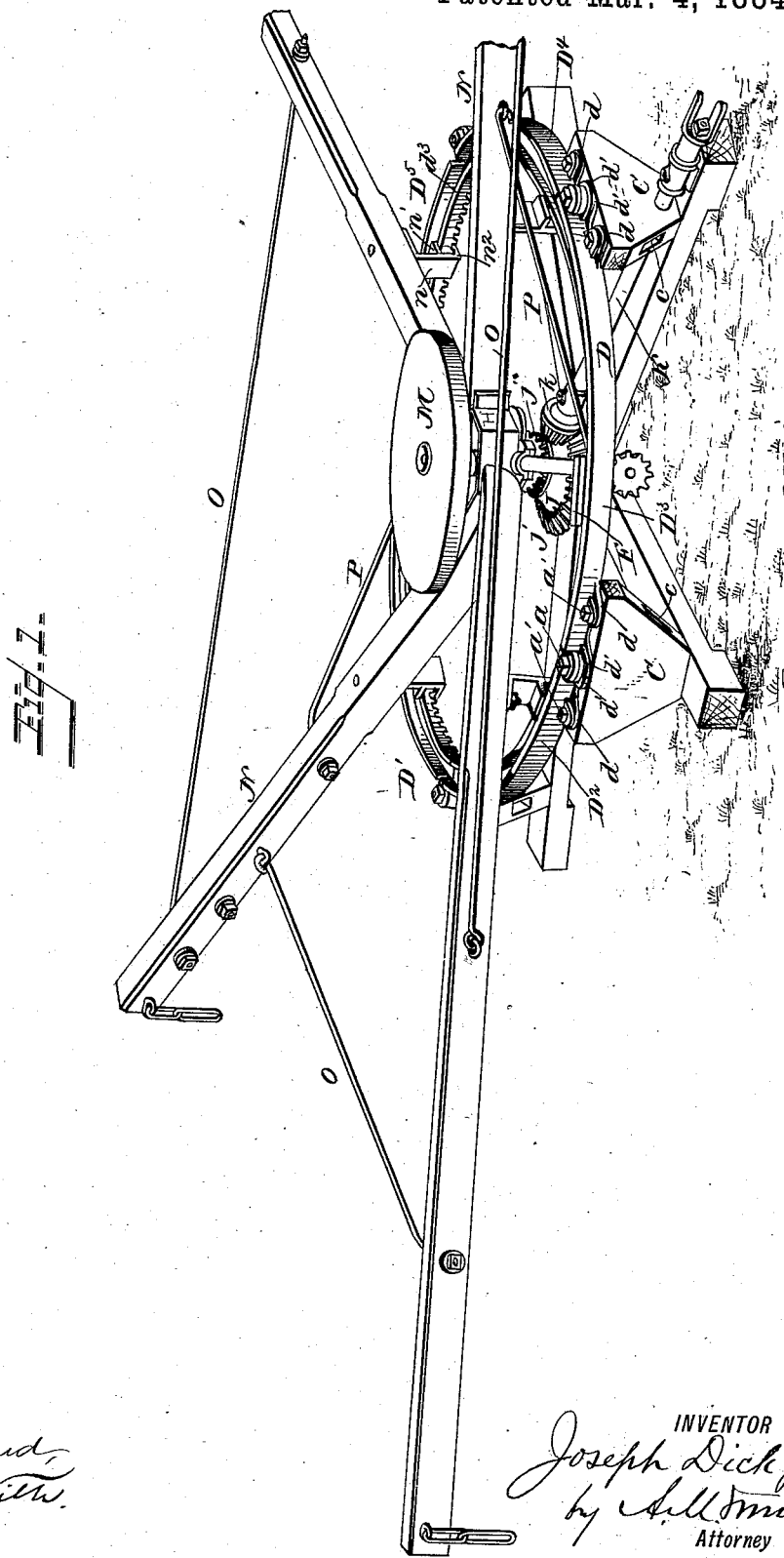

(No Model.)

J. DICK, Jr.
HORSE POWER.

No. 294,372.

Patented Mar. 4, 1884.

2 Sheets—Sheet 1.

WITNESSES
F. L. Durand
Rex Smith

INVENTOR
Joseph Dick Jr.
by A. M. Smith
Attorney (No Model.)
J. DICK, Jr.
HORSE POWER.
No. 294,372.
2 Sheets—Sheet 2.
Patented Mar. 4, 1884.
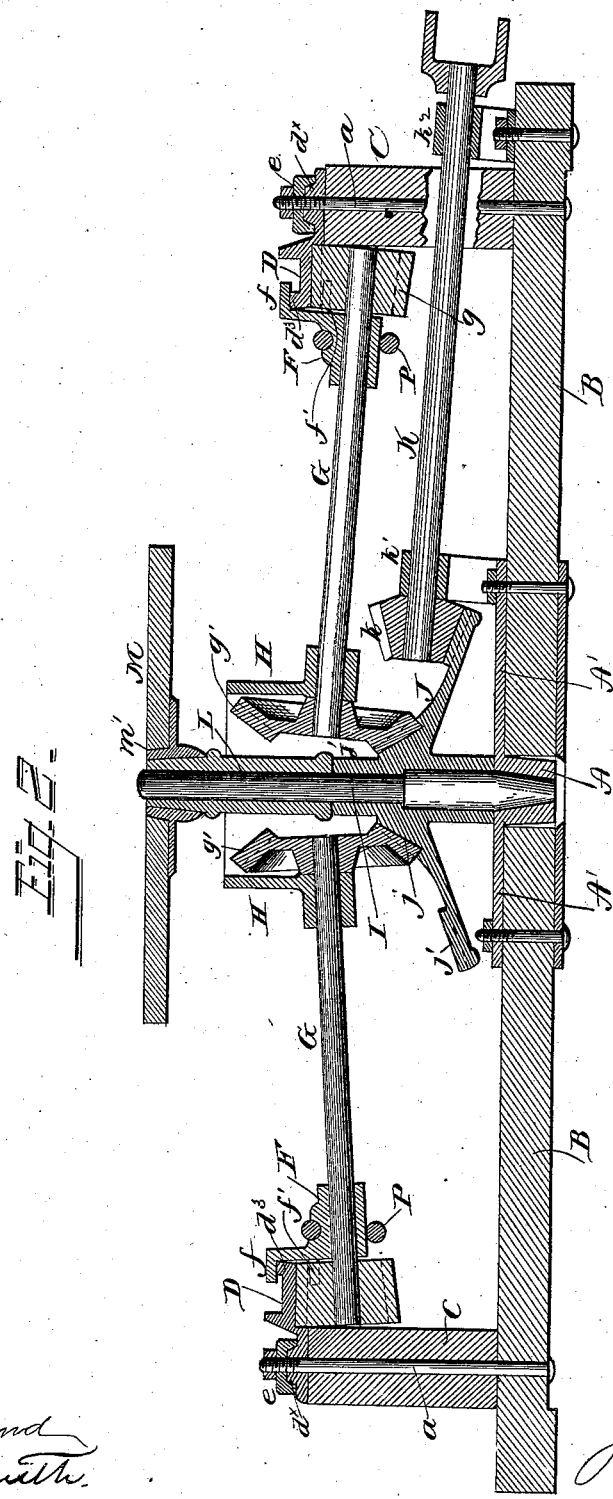
WITNESSES
F. L. Ourand
Rex. J. Smith
INVENTOR
Joseph Dick Jr.
by A. L. Smith
Attorney

UNITED STATES PATENT OFFICE.

JOSEPH DICK, JR., OF CANTON, OHIO.

HORSE-POWER.

SPECIFICATION forming part of Letters Patent No. 294,372, dated March 4, 1884.

Application filed August 16, 1883. (No model.)

*To all whom it may concern:*

Be it known that I, JOSEPH DICK, Jr., of Canton, county of Stark, State of Ohio, have invented a new and useful Improvement in Horse-Powers, of which the following is a full, clear, and exact description, reference being had to the accompanying drawings, making part of this specification.

My invention relates to a novel construction of the stationary circular rack through which rotary motion is imparted to the traveling pinion or pinions and thence to the driving-shaft, said rack being made in sections, facilitating its transportation and adapting it to be cheaply repaired when any one or more of the sections become injured or broken; to the arrangement of said rack relatively to the traveling pinion or pinions and shafts and to the concentric bevel-gear actuated therefrom, whereby the pinions are covered and protected, and whereby, also, any desired number of pinions and traveling shafts can be employed and the speed of the concentric bevel-gear actuated thereby is increased; to the construction of the bracket or shoe upholding the outer end of the traveling shaft, with its pinions, in engagement with the circular rack; to the arrangement of draft-rod connecting the sweeps or levers with the traveling shaft or shafts, and to certain details of construction and arrangement of parts, all as hereinafter explained.

In the accompanying drawings, Figure 1 is a perspective view of a horse-power embracing my improvements, and Fig. 2 represents a vertical section through the same.

A represents a central hub, provided with radial sockets or with arms A', to which radial arms or bars B are firmly secured by bolts or other suitable fastenings, and to the outer ends of these are firmly secured uprights C C, upon which the circular rack D is supported, and to which said rack is firmly secured, the above-named parts forming the frame of the horse-power, which may be readily staked to the ground or secured to a flooring in any usual or preferred manner. The rack D is toothed on its lower face, and is made in sections, (indicated by D' D² D³, &c.,) of which there may be any number desired for facilitating handling or transportation, according to the size of the power and the number of radial arms or bars B, the sections being each provided at its ends with flanges $d$ $d'$, through which they are united to the blocks or uprights C, secured to said radial bars. The flanges $d'$, at the adjoining ends of the rack-sections, are provided each on its upper face with a projection made in the form of the half of a frustum of a cone, the two, when brought together, forming a frustum of a cone, upon which is placed an inverted cup, $e$, which, when drawn down into place by the through-bolt $a$, serves to draw and clamp the ends of the adjoining sections firmly and snugly together.

The blocks C are made V-shaped, giving them extended upper faces, and the inclined sides are socketed, as shown at $c$, to accommodate the heads of bolts $a'$, passing through them and the flanges $d$, and further rigidly securing the sections of the circular rack. The toothed portions of the circular rack project inside of the support C, and are provided on their upper faces with vertical ribs at their inner and outer edges, which, when the sections are secured together, form annular ribs or flanges, which serve to stiffen and strengthen the rack while avoiding undue weight of material. The inner one of these ribs, $d^3$, serves also as a track or way, on which is supported a flanged shoe or bracket, F, in which the outer end of the traveling shaft G is supported and has its bearing. The bracket F has an outwardly-projecting rib, $f$, formed upon its upper side or end, which rests and travels on the track or annular rib $d^3$, and is perforated, to form a bearing for the outer end of shaft G, which, on its extreme end, outside of said bracket, has a pinion, $g$, fast upon it, which engages with the toothed rack D. The inner end of the shaft or shafts G has its bearing in an open polygonal frame, H, surrounding a central shaft, I, which is "stepped" in the central hub, A, and within said frame, on the end of shaft G, is secured a bevel-pinion, $g'$, which engages with a circle of teeth, $j$, of a double bevel-wheel, J, imparting motion to the latter around the central shaft or spindle, I, on which said gear is mounted. The gear-wheel J is enlarged in diameter below the circle of teeth $j$, and has a second circle of teeth, $j'$, with which a bevel-pinion, $k$, fast on the inner end of a driving-shaft, K, engages. The shaft K is mounted in suitable bearing-brackets, $k'$ $k^2$, on the stationary central hub and one of the radial frame-bars, and, extending outside of or beyond the rack D, is connected with the machinery to be operated by it in any usual or preferred manner.

Above the hub J' of the double bevel-wheel J, and on the shaft I, is placed loosely a sleeve, L, provided with a collar or circular rib near its upper end, and made slightly tapering above said rib, and upon said end is supported the driver's stand or support M, consisting of a circular table or disk provided with a central hub or thimble, $m'$, which fits over the tapering end of the sleeve L, as shown.

The sweeps or levers N are rigidly secured at their inner ends to the sides of the central frame, H, and, where they cross the rack D, are provided with pendent brackets $n$, having outwardly-projecting flanges $n'$ $n^2$ on their lower ends, one, $n'$, resting and moving on the circular rib or track $d^3$, and serving to uphold the outer end of the sweep, and the other passing under the teeth of the rack and serving to prevent accidental displacement of the sweep. These sweeps are connected by tie-rods O, and have also connected with them draft-rods P, which at their rear ends are provided each with loop or eye, which surrounds a sleeve portion of the outer bracket, F, of the traveling shaft G, the rod P extending thence forward and upward to the sweep or lever in advance of it, and to which its forward end is connected. By this arrangement of the draft rod or rods P the power is applied exactly at the point where it is required for propelling the traveling shaft, and undue strain between the parts is prevented, while by the upward inclination of said rod it tends to hold and lift the traveling pinion up snugly in mesh with the rack.

By forming the teeth on the lower face of the circular rack, said teeth and the pinion meshing therewith are covered and protected from dust and other obstructing matter, while by the arrangement of the pinions and the traveling shaft, which engage one with the circular rack and the other with the central pinion operated from said rack, both on the same side of the axial center of movement of the rack above and the central pinion below the horizontal plane of said traveling shaft, the central pinion is made not only to rotate in the same direction with the direction of movement of the team, instead of in the reverse direction, as in the ordinary arrangement, but the revolution of the team around the central pinion is equivalent to a revolution of a rack in the reverse direction with the team standing still, thus adding to the speed of movement of the central pinion, whereas a reverse effect is produced when both the rack and central pinion are arranged upon the same side of the horizontal plane of the traveling shaft and both engage therewith on the same radial line or same side of the axial center. By the arrangement described, also, I am enabled to get a "low down" power particularly favorable to the application of the draft of the team.

A flange or shoe, $f''$, projects from the bracket F underneath the teeth of the rack D, in rear of the pinion $g$, and serves to prevent the rocking or accidental displacement of said bracket.

Parts of the power not particularly described may be constructed in any usual manner.

Having thus described my invention, I claim as new—

1. In a horse-power, the stationary circular rack, toothed on its lower face, in combination with the traveling pinion engaging therewith, and a bevel-wheel concentric with said rack and actuated therefrom, substantially as described.

2. In a horse-power, a circular rack composed of sections cogged on their lower faces, in combination with and supported by stationary uprights, to which they are secured, substantially as described.

3. In a horse-power, the stationary circular rack or ring toothed on its lower face, in combination with the traveling shaft geared thereto and a bevel-gear arranged below the plane of and geared to said traveling shaft, substantially as described.

4. In a horse-power, the frame of the machine, consisting of radial arms, a central flanged or socketed hub, the uprights secured to said arms, and a stationary circular rack, made in sections toothed upon their lower surfaces, and secured to and connecting said uprights, substantially as described.

5. The circular rack, made in sections, each provided with flanged and semi-conical projections, in combination with the supporting-standard, the socketed cap-pieces, and the through-bolts for uniting said sections to each other and to the radial arms of the frame, substantially as described.

6. The combination of the circular rack, the central bevel-gear, and the connecting traveling shaft, said rack and bevel-gear being geared to the traveling shaft, the rack above and the bevel-gear below the horizontal plane thereof, and both on the same side of the axial center of the bevel-wheel, substantially as described.

7. The stationary circular rack, in combination with the sweep for actuating the traveling pinion and the draft-rod connecting said sweep with the pinion-shaft bearing, in the manner and substantially as specified.

8. The stationary circular rack, toothed on its lower face, in combination with a traveling shaft and its pinion, and a sliding shoe upholding said pinion in engagement with the lower surface of the rack, and forming a bearing for the shaft thereof, substantially as described.

In testimony whereof I have hereunto set my hand this 31st day of July, A. D. 1883.

JOSEPH DICK, JR.

Witnesses:
GEO. K. RUNDEL,
J. W. HAMILTON JOHNSON.